(12) United States Patent
Gil et al.

(10) Patent No.: US 7,341,127 B2
(45) Date of Patent: Mar. 11, 2008

(54) ELECTRICALLY POWERED PARKING BRAKE

(75) Inventors: Sergio Nieto Gil, Zaragoza (ES); Juame Prat Terradas, Barcelona (ES)

(73) Assignee: Fico Cables, S.A., Rubi (Barcelona) (ES)

( * ) Notice: Subject to any disclaimer, the term of this patent is extended or adjusted under 35 U.S.C. 154(b) by 405 days.

(21) Appl. No.: 10/363,613

(22) PCT Filed: Jun. 27, 2001
(Under 37 CFR 1.47)

(86) PCT No.: PCT/EP01/07341
§ 371 (c)(1),
(2), (4) Date: Nov. 24, 2003

(87) PCT Pub. No.: WO02/20324
PCT Pub. Date: Mar. 14, 2002

(65) Prior Publication Data
US 2005/0189183 A1 Sep. 1, 2005

(30) Foreign Application Priority Data
Sep. 5, 2000 (DE) ................................ 100 43 739

(51) Int. Cl.
*F16D 65/36* (2006.01)
(52) U.S. Cl. ..................................... 188/2 D; 188/156
(58) Field of Classification Search ................ 188/2 D, 188/156, 106 P, 265
See application file for complete search history.

(56) References Cited
U.S. PATENT DOCUMENTS

| 5,590,744 | A | 1/1997 | Belmond |
| 5,631,530 | A | 5/1997 | Hoppe et al. |
| 5,769,189 | A * | 6/1998 | Heibel et al. ............... 188/156 |
| 6,244,394 | B1 | 6/2001 | Gutierrez et al. |
| 6,279,692 | B1 | 8/2001 | Siepker et al. |
| 6,386,338 | B1 * | 5/2002 | Powrozek ................... 188/156 |
| 6,609,595 | B2 * | 8/2003 | Flynn et al. ................ 188/156 |
| 6,848,545 | B2 * | 2/2005 | Scheuring et al. .......... 188/2 D |

FOREIGN PATENT DOCUMENTS

| DE | 19620463 | 11/1997 |
| DE | 19755933 | 8/1999 |
| DE | 19818339 | 2/2000 |

(Continued)

*Primary Examiner*—Bradley King
(74) *Attorney, Agent, or Firm*—Renner, Otto, Boissells & Sklar, LLP

(57) ABSTRACT

A parking brake which is connected to at least two brake cables, in particular for a parking brake system of motor vehicles, comprising: an actuator with linking devices to which the at least two brake cables are coupled at linking places and an operator configured and connected to the actuator such that it can change the distance between the linking places in a controlled manner whereby a relative movement of the linking places to each other or away from each other is enabled. Preferably, the parking brake comprises a set of gears and an electric motor for generating and transmitting a rotation wherein the rotation is transformed into a linear movement by way of the actuator. The actuator includes a load sensing device for measuring the load applied to the brakes. The parking brake assures a uniform operation of the respective brakes and a comfortable control with reduced efforts for adjustment and maintenance.

19 Claims, 6 Drawing Sheets

FOREIGN PATENT DOCUMENTS

Figure 1:
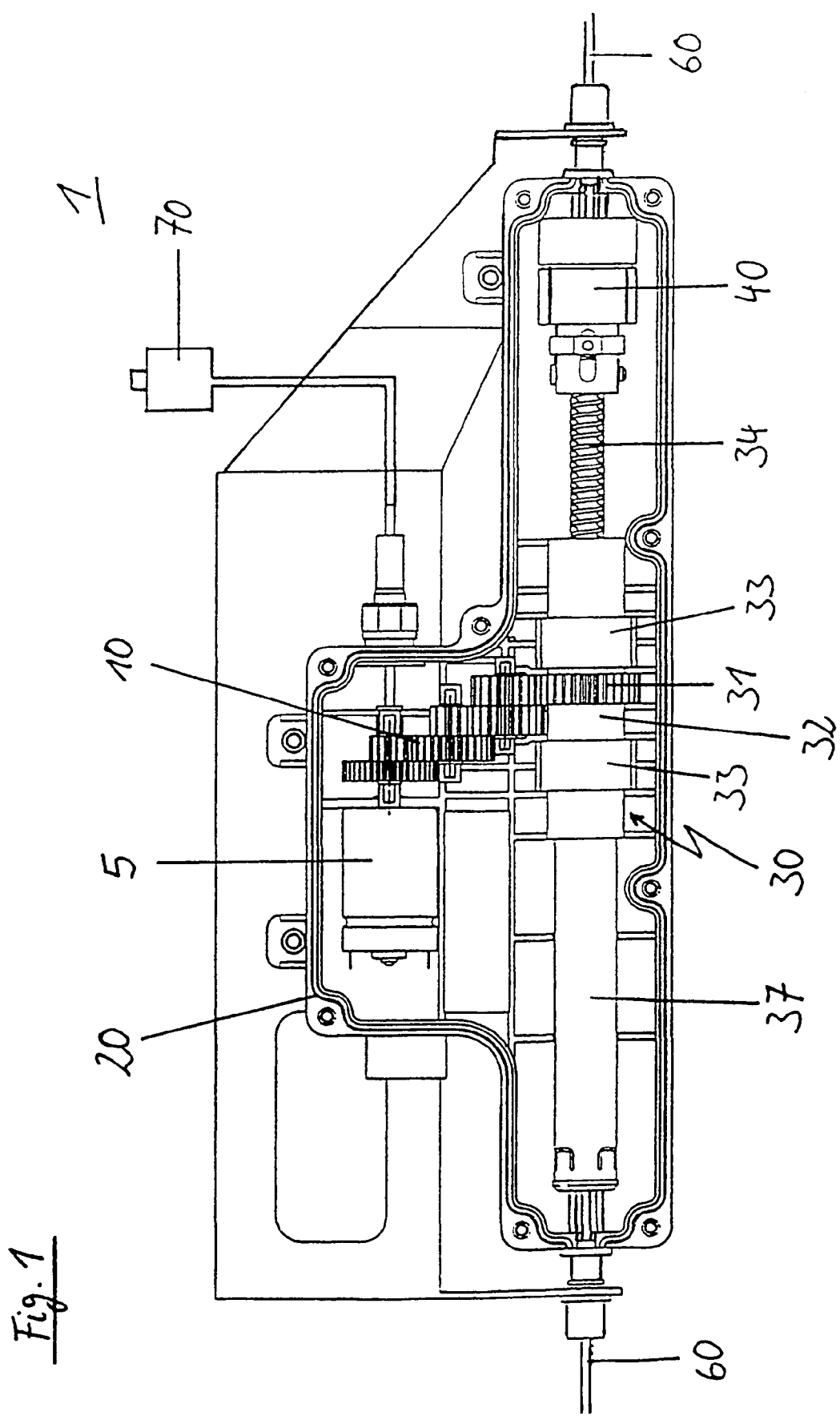

| | | |
|---|---|---|
| DE | 19853656 | 6/2000 |
| EP | 0 995 657 | 4/2000 |
| FR | 2597820 A * | 10/1987 |
| WO | 98/56633 | 12/1998 |
| WO | 99/30939 | 6/1999 |
| WO | 99/43969 | 9/1999 |

* cited by examiner

ELECTRICALLY POWERED PARKING BRAKE

This application is a national phase under 35 U.S.C. 371 of International Application No. PCT/EP01/07341, filed Jun. 27, 2001 and published in the English language.

TECHNICAL FIELD

The present invention relates to an electric parking brake, in particular for a parking brake system of motor vehicles, which is preferably operated by an electric motor and which uniformly controls the brakes.

PRIOR ART

Motor vehicles of different types mostly comprise two different brake systems. One brake system serves to reduce the speed of the vehicle during the drive and it is hydraulically or pneumatically operated for example by a paddle. A further brake system is used for securing the vehicle during parking. In such a brake system the brakes are mostly operated via brake cables which are loaded with a tensile load by means of different lever mechanisms in the passenger compartment. These brakes are also denoted as hand brakes or lever brakes.

The prior art provides different solutions for hand brakes and lever brakes. This brake can be operated either by hand or by foot. Since sometimes substantial forces are needed to operate the hand brake, it is often not applied in the needed degree especially by elderly persons. Thereby on one hand a safety risk is caused because the car can roll away during parking and on the other hand the operation of the hand brake is uncomfortable. To reduce these forces, parking brakes are known from the prior art which are operated for example via an electric motor.

Apart from the comfortable operation of the brake lever, the tensile load generated by the parking brake has to be uniformly transmitted to the brakes typically arranged at the rear wheels. In the device of the DE 198 53 656 A1, for each brake one braking cable is guided to the operating element of the parking brake which can for example be a lever or an electric motor. For uniformly operating the brakes both brake cables are mounted on a lever in the same distance from the middle of the lever, respectively. The lever is slewably connected to the operating element of the parking brake via a further brake cable. Because of the slewability of the lever the loads are uniformly distributed to the brake cables. A disadvantage is that the length of the brake cables on the lever have to be adjusted with substantial effort in order to later uniformly operate the brakes. Additionally, the adjustment has to be repeated in regular intervals since the brake cables misadjust for example by strain.

In a further hand brake system developed by the applicant, the brake cables of the rear wheels are connected via a so-called distributor. The distributor is connected to the operating element of the parking brake via a brake cable. The distributor asures that while applying the hand brake the brake cables of the rear wheels are shortened to same parts, respectively. The distance to be shortened is defined by the brake cable which is connected to the operating element. In spite of the usability of this system the high effort for adjustment and maintenance of the three different brake cables is a great disadvantage and causes substantial costs.

In a further hand brake system developed by the applicant, each brake cable of the rear wheels is connected to an electric motor. The brakes are operated by controlling the electric motors. The electric motors can for instance, wind up the brake cables like a winch. For uniformly braking both rear wheels on the one hand the length of both brake cables have to be exactly adjusted and on the other hand the electric motors have to rotate in the same way. This leads again to the disadvantage of a high effort for adjusting the brake cables and an expensive electrical control of the electric motors enabling the functioning of the parking brake system.

A further electric parking brake is disclosed in DE 198 18 339 C1. In this brake system the brakes are operated via a roller which is driven by an electric motor. The ends of the brake cables of the rear wheels are attached on opposite sides on the circumference of the roller. During rotation of the roller, parts of equal lengths of both brake cables are simultaneously rolled up on the roller and thereby the rear wheels are uniformly braked. The expensive length adjustment of the brake cables in order to enable the uniform operation of the brakes is again a disadvantage in this case. Additionally the brake cables have to be regularly checked and readjusted because they misadjust during use.

The WO 98/56633 describes a parking brake system for passenger motor vehicles comprising a setting unit having a motorized drive element, for example an electric motor, for tightening or releasing an actuating pull cable of a braking system of the vehicle. The setting unit has a setting member for the actuating pull cable to which a force-sensing device is assigned.

It is a disadvantage of this electric parking brake that it operates only one brake cable. As a consequence, a second brake cable has to be connected via a distributor which requires additional efforts for installation and maintenance and which increases the weight of the vehicle. The operation of the electric parking brake can be restricted by the strain of the brake cables. Therefore, the electric parking brake has to be regularly maintained in order to assure a uniform operation of the brakes. The efforts of installation and maintenance as well as the technically complex electric parking brake itself are a great disadvantage.

Based on the prior art it is therefore the problem of the present invention to provide a parking brake which controls two brake cables at the same time and which does not require additional transmitting and distributing elements. Furthermore, the parking brake shall induce low maintenance and installation costs, shall be produced relatively simple and shall ensure a trouble-free operation.

SUMMARY OF THE INVENTION

The present invention solves this problem by providing a parking brake as defined in claim 1. Further features are included in the dependent claims which separately or in combination represent preferred embodiments.

The parking brake according to the invention which is connected to at least two brake cables in particular for a parking brake system of motor vehicles, comprises an actuator with linking means to which the at least two break cables are coupled at linking places and an operation means configured and connected to the actuator such that it can change the distance between the linking places in a controlled manner whereby the distance between said linking places increases or decreases.

Due to the use of an actuator, a simultaneous operation of two brake cables with equal force at each cable is enabled which preferably operate the brakes of the rear wheels of motor vehicles. This actuator can be realized on the basis of mechanical, hydraulic or pneumatic systems. In this way load distributing systems operated after the controlling units are no longer necessary and enable the provision of a compact parking brake system.

In a first embodiment, the operation means of the parking brake according to the invention comprises a set of gears and an electric motor for generating and transmitting a rotation to the actuator so that a transformation of the rotation in a linear movement of the linking places of the linking means for the simultaneous operation of the at least two break cables is enabled by the actuator.

According to a first preferred embodiment, the present invention provides a parking brake which can be easily and comfortably operated by means of an electric motor. The rotation of the electric motor is transmitted by means of a set of gears on the one hand to mechanically relieve the electric motor and on the other hand to optimally transmit the force. Preferentially, the said actuator is used for transformation of the rotation in a linear movement. In this manner an appropriate load transmission to at least two brake cables and the brakes connected therewith is assured by means of a simple assembly.

According to a further embodiment, the linking means comprises two ends each connected to one brake cable. Furthermore the actuator according to the invention comprises a spindle and a nut wherein the spindle is guided in the nut such that an screwing on or an unscrewing of the nut from the spindle is enabled by the transmitted rotation.

The connection of the brake cables to the ends of the linking means of the parking brake and the inventive construction with the above components assure a simultaneous and uniform distribution of the generated mechanical to the connected brakes.

In one embodiment of the parking brake, the actuator comprises an rotation cylinder with a crown gear which is arranged such that the crown gear of the rotation cylinder can engage the set of gears and thereby enables the transmission of the rotation of the set of gears to the rotation cylinder.

The rotation generated by the electric motor is transmitted via the set of gears to the rotation cylinder by using a crown gear. The rotation of the rotation cylinder leads to a shortening or an lengthening of the actuator whereby the ends of the brake cables are displaced.

In a preferred embodiment of the parking brake, the actuator comprises a hollow cylinder having longitudinal grooves and the nut is attached near an inner end of the hollow cylinder such that the spindle can be partly received by the hollow cylinder by the screwing on or unscrewing of the nut from the spindle and thereby the distance between the linking places is changed; or the actuator comprises a hollow cylinder with thread and the nut is attached near an inner end of the rotation cylinder such that the spindle can partly received by the hollow cylinder with thread by the screwing on or unscrewing of the nut from the spindle and thereby the distance between the linking places is changed.

The inventive actuator comprises in two preferred embodiments a hollow cylinder with longitudinal grooves and nut or a hollow cylinder with thread. The actuator shortens by screwing the spindle in the hollow cylinder with grooves and nut or by screwing the spindle and the hollow cylinder with thread in the rotation cylinder. The length of the actuator defines a certain distance between the ends of the brake cables. If the distance between the ends of the brake cables is decreased the generated tensile load is uniformly distributed to both rear wheels. In the case of increasing said distance, the brake cables are unloaded, respectively, and the brakes are released.

In a further embodiment, one brake cable is coupled to a terminal region of the spindle by the linking means and the other brake cable is coupled to a terminal region of the hollow cylinder or to a terminal region of the hollow cylinder with thread wherein the brake cable is coupled to the terminal region of the hollow cylinder or to the terminal region of the hollow cylinder with thread by means of a positive connection such that a decoupling of the rotation from the brake cable is enabled. To this end, the brake cable comprises an enlargement and the end of the hollow cylinder or the hollow cylinder with thread comprises an attaching means wherein the end of the brake cable engages a slit-like opening of the attaching means.

The brake cable is connected to the respective hollow cylinder by means of the connection according to the invention. If the brake cable also rotates, this action will lead to damage or destruction of the brake cable. By means of the positive connection, the brake cable is attached decoupled from the rotation and at the same time an unrestricted operation of the brakes is enabled.

In another embodiment, the rotation cylinder comprises projections at its inner surface which engage the grooves of the hollow cylinder whereby the rotation of the rotation cylinder can be transmitted to the hollow cylinder or the rotation cylinder comprises a thread complementary shaped to the thread of the hollow cylinder with thread whereby the hollow cylinder with thread can be screwed in or screwed out of the rotation cylinder with thread by the rotation of the rotation cylinder with thread.

According to a further embodiment, the thread of the nut and the thread at the inner surface of the rotation cylinder have opposite sense of rotation so that the spindle and the hollow cylinder with thread can be screwed in or screwed out of the rotation cylinder with thread at the same time by the rotation of the rotation cylinder with thread.

Dependent on the preferred embodiments of the actuator, the rotation cylinder is differently shaped. The length of the actuator is varied by rotation of the rotation cylinder. On the one hand, it is enabled by screwing the hollow cylinder with nut on the spindle by means of the rotation cylinder with longitudinal grooves. On the other hand, the rotation cylinder with thread and nut can simultaneously screw the spindle and the hollow cylinder with thread in the rotation cylinder or out of the rotation cylinder.

A further embodiment of the parking brake comprises a manual emergency system by which the parking brake can be manually operated in the case of a failure of the operation means, in particular wherein the manual emergency system comprises a manually operable torque transmission means preferably a flexible shaft for transmitting a torque to the operation means.

In the case of a failure of the operation means of the parking brake, it is possible to transmit a torque to the set of gears of the parking brake by means of the emergency system in order to operate the brakes in this way. The torque is transmitted via a flexible shaft. In this way it is assured, that the parking brake can be operated in every situation.

In one embodiment the manual emergency system comprises a lock with key which can be displaced against the force of a spring such that the flexible shaft is connected to the axis of the electric motor or to an elongation thereof.

By the preferred embodiment of the emergency system, it is assured that the flexible shaft is not permanently connected to the axis of the electric motor or an elongation thereof. Only by using the appropriate key, an effective connection can be realized for operating the parking brake.

This connection is again released by the effect of the spring as soon as the emergency system is no longer used.

Furthermore, the present invention provides a parking brake wherein a load sensor is coupled to the actuator.

The preferred inventive combination of the parking brake and the load sensor of the present invention provides a system that is protected against mechanical overload and therefore also against damage and destruction due to the use of the load sensor.

According to an embodiment, the load sensor comprises a Hall-chip and a magnet and a coupling unit, wherein the load sensor together with the coupling unit can be attached between the linking places of the linking means such that it determines the mechanical loading of the brake cables.

The load sensor according to the invention serves for protecting the parking brake and the brake cables against mechanical overload. The general braking load generates a relative movement of the magnet with respect to the Hall-chip.

Thereby, an electric signal is induced based on the Hall effect by means of which the mechanical loading of the parking brake can be determined.

In one embodiment, the magnet is arranged such that the magnet can be displaced against the force of at least one spring during operation of the parking brake whereby a loading signal is generated in the Hall-chip. Preferably, the load sensor comprises a reset spring for resetting a control element in the load sensor, a maximum tension spring for generation of a mechanical reference loading opposing the loading of the brake cables and a pretension spring for pretension of the brake cables.

The springs used in the load sensor are compressed dependent on the mechanical loading. Accordingly, the magnet is displaced with respect to the Hall-chip and generates a signal. Since the spring constants are known, the generated signal can be assigned to certain mechanical loading. In this manner, the mechanical loading can be effectively verified. Furthermore, the different springs are used for example in order to support the positioning of the magnet with respect to the Hall-chip or to cause a prestress in the connected brake cables.

A further embodiment provides the load sensor with a housing having two parts the parts of which are connected such that the springs can be variably prestressed. In order to properly adjust the springs placed in the load sensor, the housing is provided in two parts. The two parts of the housing can be connected to each other so that the springs in the interior of the housing are differently prestressed.

In one embodiment, the Hall-chip and the magnet are adjustably mounted in the load sensor.

The adjustability of the Hall-chip and the magnet enable an optimal positioning with respect to each other. Thereby, a reliable signal and a signal corresponding to the loading is provided.

SHORT DESCRIPTION OF THE DRAWING

Figure 2:
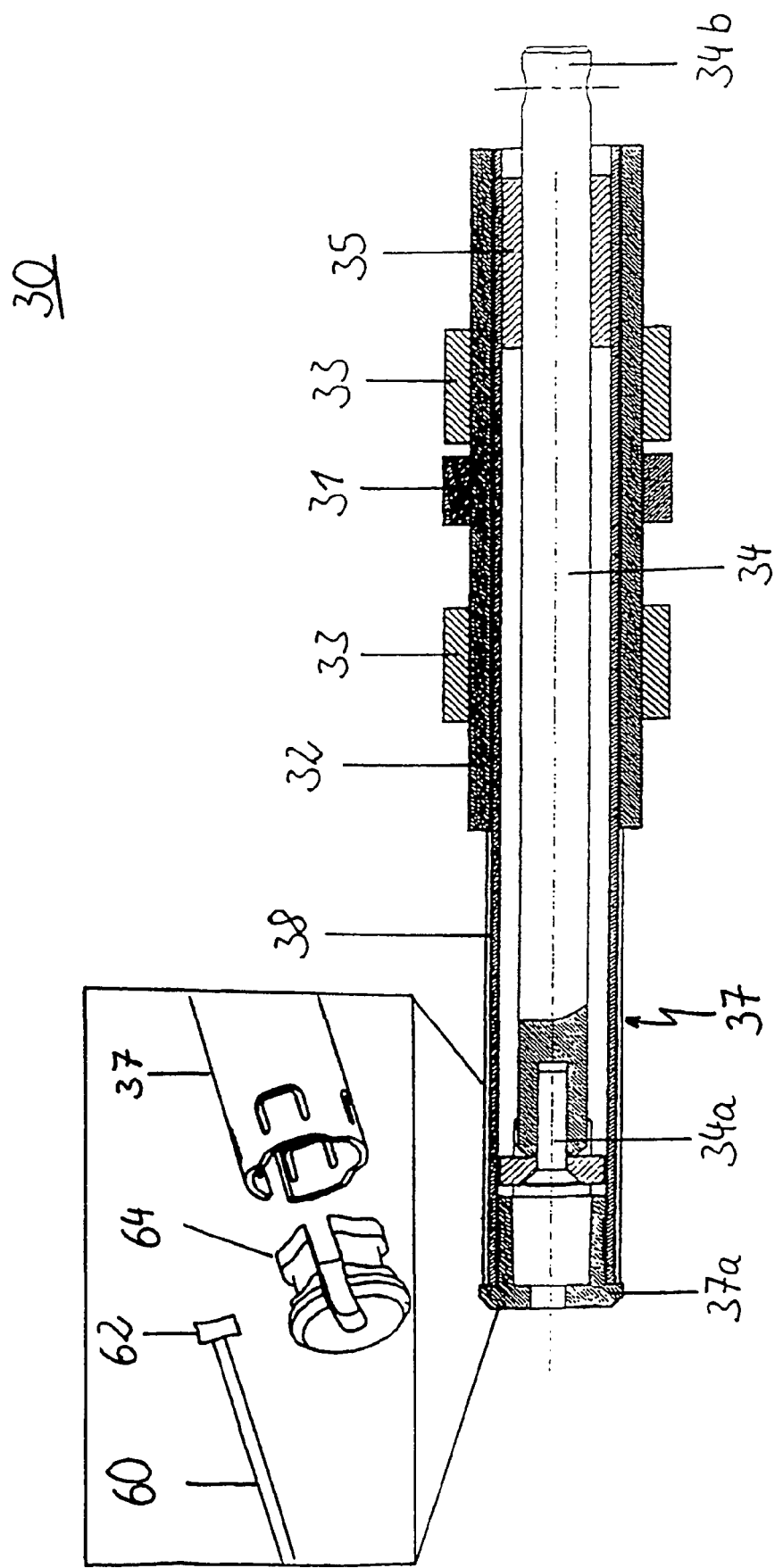
Figure 3:
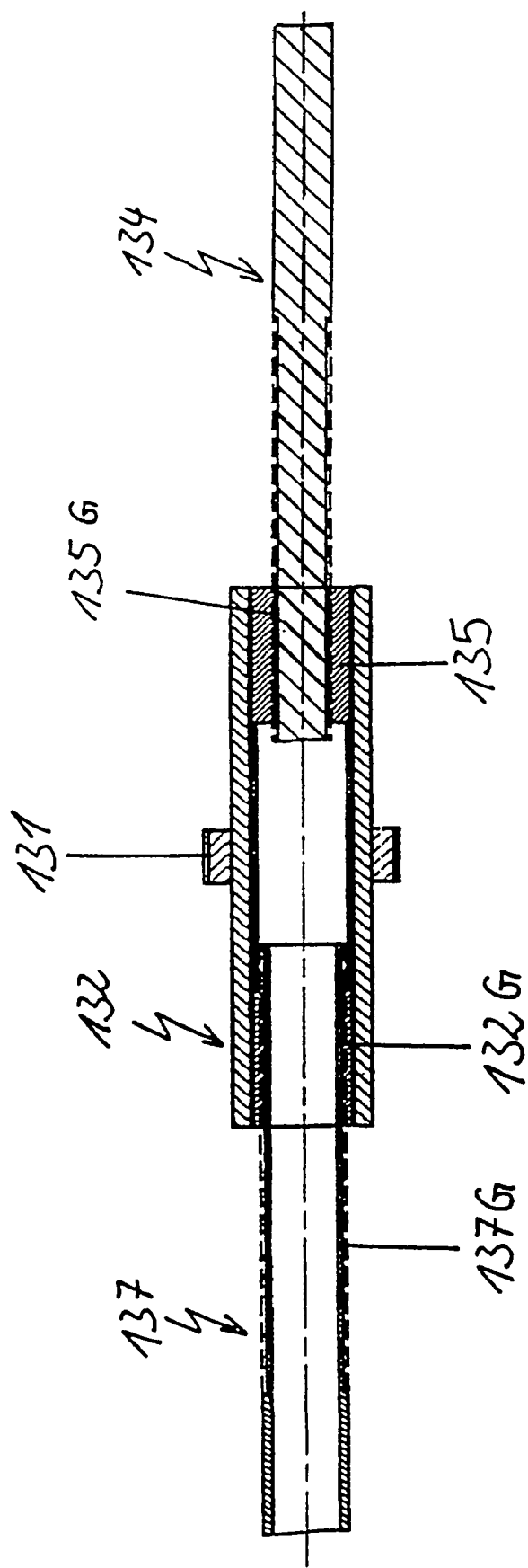
Figure 4:
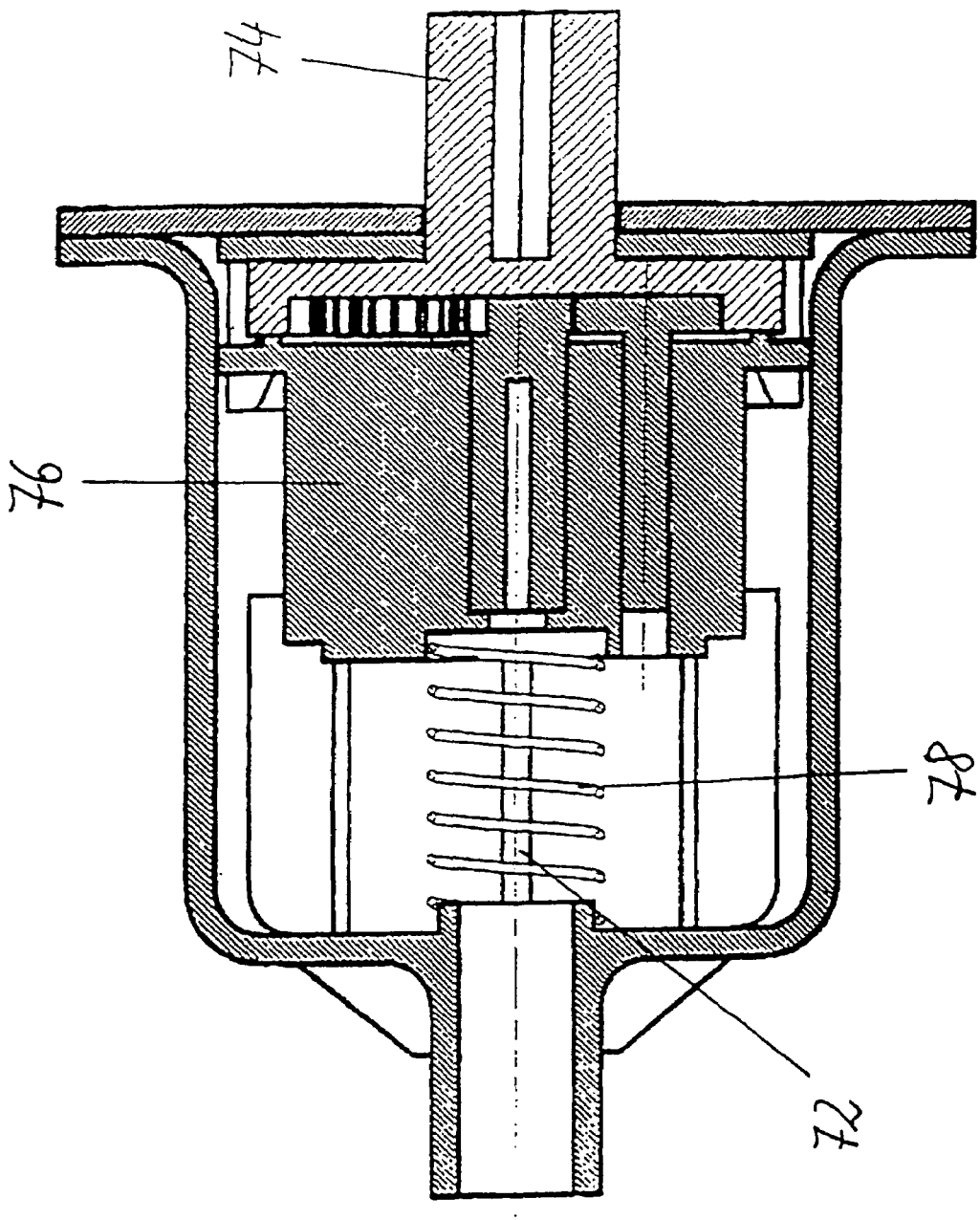
Figure 5:
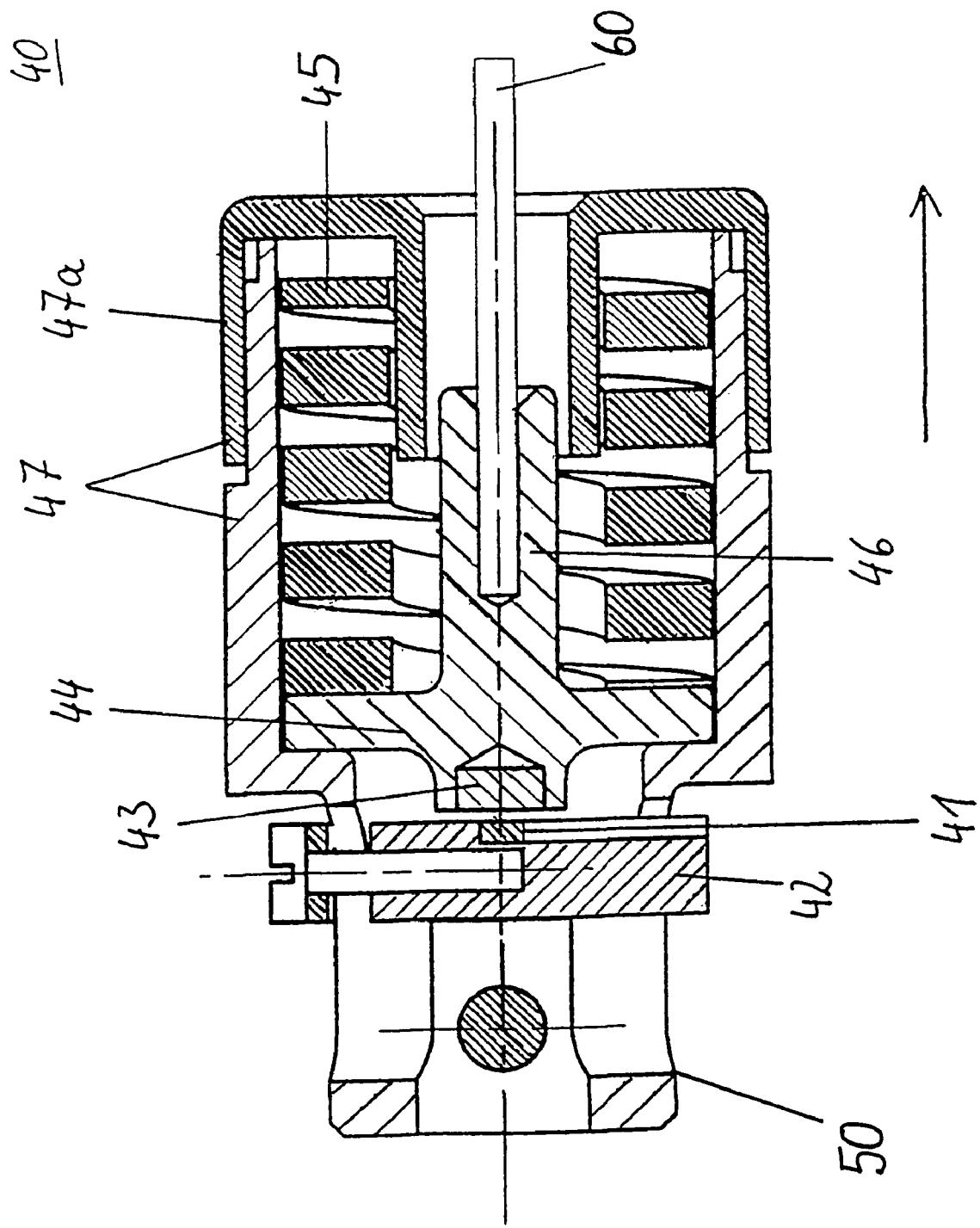
Figure 6:
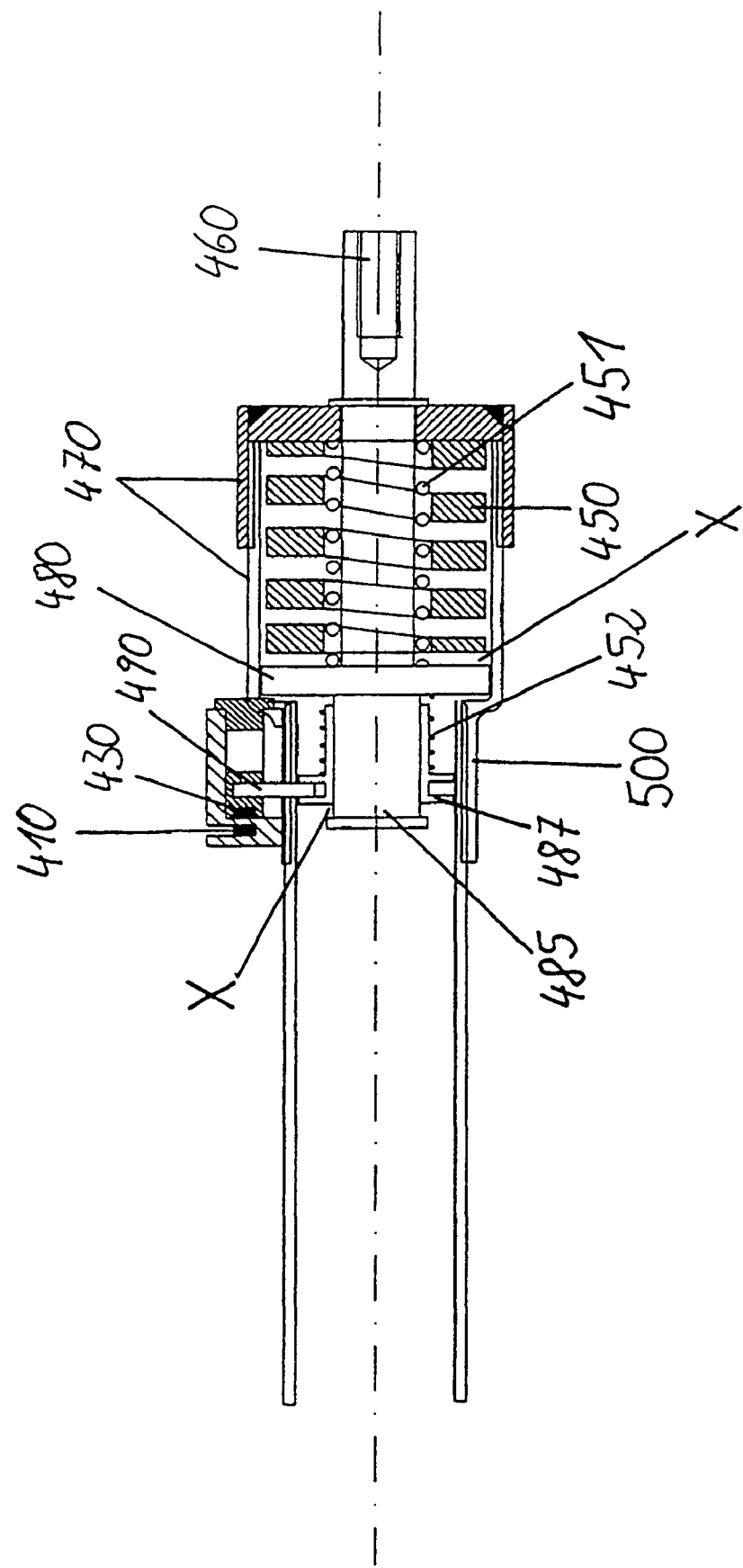

In the following detailed description the presently preferred embodiments of the present invention are described with reference to the drawing; it shows:

FIG. 1 General view of the electric parking brake according to the invention according to a first preferred embodiment;

FIG. 2 A sectional view of the actuator of the electric parking brake according to the invention according to a first preferred embodiment;

FIG. 3 Sectional view of the actuator of the electric parking brake according to the invention according to a second preferred embodiment;

FIG. 4 A side view of the manual emergency system according to a preferred embodiment;

FIG. 5 A side view of the load sensor according to a first preferred embodiment; and FIG. 6 A side view of the load sensor according to a second preferred embodiment.

DETAILED DESCRIPTION OF THE INVENTION

The parking brake 1 according to a first preferred embodiment of the present invention is shown in FIG. 1 in a general view. It is surrounded by a housing 20 for protection against soiling and damage. The parking brake is operated by an electric motor 5 and a set of gears 10. The electric motor 5 is indirectly controlled by the driver by using appropriate operation controls and sensors coupled thereto. The dimension and the type of the set of gears 10 depend on the used electric motor 5. The set of gears 10 serves for the optimal force transmit as well as the protection of the electric motor 5 against overload.

The set of gears 10 drives an actuator 30 according to the invention via a crown gear 31. The rotation of the electric motor 5 is transformed in a linear movement by means of the actuator 30. This linear movement of the actuator 30 is according to the invention transmitted via brake cable 60 to the respective brakes to be operated. To this end in the first preferred embodiment of the electric parking brake on each of the both ends of the actuator 30 respectively a brake cable 60 for instance in the configuration of a bowden cable is attached. The sheath of the brake cable respectively is supported by the housing 20.

The actuator 30 according to the invention according to a first preferred embodiment of the electric parking brake 1 comprises a rotation cylinder 32 with a crown gear 31 and two bearing bushes 33, a spindle 34 and a hollow cylinder 37 with nut 35. The crown gear 31 and the bearing bushes 33 are attached to the outside of the rotation cylinder 32. The rotation of the set of gears 10 is transmitted to the actuator 30 via the crown gear 31 whereas the bearing bushes 33 serve as appropriate bearing of the rotation cylinder 32 and of the whole actuator 30. At its inner surface the rotation cylinder 30 comprises projections. These projections engage longitudinal grooves 38 which extend on the outside along the longitudinal axis of the hollow cylinders 37 (see FIG. 2). The positive connection between the said projections of the rotation cylinder 32 and the longitudinal grooves 38 of the hollow cylinder 37 enable the transmission of the rotation to the hollow cylinder 37. The hollow cylinder 37 is simultaneously displaceable along the longitudinal axis of the rotation cylinder 32.

FIG. 2 shows a sectional view of the actuator 30 according to a first preferred embodiment of the present invention in the state of maximum shortening. As can be seen in the illustration the nut 35 is mounted in the interior close to the end of the hollow cylinder 37 directed to the spindle 34. On the opposite end of the hollow cylinder 37 one of the brake cables 60 (not shown) is attached. The nut 35 comprises at its inside a thread complementary shaped to the spindle 34 so that the hollow cylinder 37 with nut 35 can be screwed on the spindle 34 or can be screwed off the spindle 34. The screwing and unscrewing of the hollow cylinder 37 with nut 35 on the spindle 34 is possible, because a rotation of the spindle 34 is prevented.

When the electric motor 5 is operated its rotation is transmitted via a set of gears 10 and the crown gear 33 to the rotation cylinder 32. By the rotation cylinder 32 the hollow cylinder 37 with nut 35 is also rotated by means of said projections. Dependent on the direction of rotation of the hollow cylinder 37 with nut 35 it is screwed on the spindle 34 or unscrewed therefrom. Thus the actuator 30 shortens or elongates. Since the brake cables 60 are attached to the ends of the actuator 30 they are tightened by the shortening of the actuator 30 or they are unloaded due to the elongation of the actuator 30. Furthermore, the tensile loading is uniformly distributed to the brake cables 60 since the hollow cylinder 37 with nut 35 and the spindle 34 are freely displaceable within the rotation cylinder 32. Thereby the brakes to be operated are also uniformly applied by the brake cables 60.

At the end 34A of this spindle 34 which is arranged inside of the hollow cylinder 37 an abutment is attached. This abutment protects the spindle 34 against damage in case it should be screwed to far in the hollow cylinder 37. On the opposite end 34B of the spindle 34 the brake cable 60 is connected via a load sensor 40 with the spindle 34 (see FIG. 1). The load sensor 40 serves for controlling the load of the electric parking brake 1 according to the invention. In the case of an occurring overload of the electric parking brake 1 the whole system can be released or switched off thereby in order to prevent or limit damage. The load sensor 40 is described in detail below.

At the outer end 37A of the hollow cylinder 37 remote from the nut 35 the brake cable 60 is attached. The type of attachment guarantees that the brake cable 60 is decoupled from the rotation of the hollow cylinder 37, see FIG. 2. Therefore, the end of the brake cable 60 comprises an enlargement 62 having a greater diameter than the brake cable 60. A complementary attaching means 64 which for example can be connected to the hollow cylinder 37 or can be directly integrated in the hollow cylinder 37, preferably comprises a slit-like opening. The slit-like opening is wider than the brake cable 60 and narrower than the enlargement 62. By inserting the brake cable 60, a positive connection is created between the brake cable 60 and the attaching means 64 by means of which only tensile forces and no torque can be transmitted. Preferably, the attaching means 64 can also be connected to the actuator 130 according to the embodiment shown in FIG. 3.

FIG. 3 shows a second preferred embodiment of the actuator 130 according to the present invention. In this preferred embodiment the nut 135 is attached inside and close to the end of the rotation cylinder 132 directed to the spindle 134. The nut 135 comprises at its inside a thread 135G complementary shaped to the spindle 134. The inside of the rotation cylinder 132 near the hollow cylinder with thread 137 and the outside of the hollow cylinder with thread 137 also comprise a thread 132G, 137G which are complementary shaped to each other. The thread 135G of the nut 135 and the thread 132G of the rotation cylinder 132 have opposite sense of rotation. When the rotation cylinder 132 is rotated by the set of gears 10 and the electric motor 5, the spindle 134 and the hollow cylinder with thread 137 are simultaneously screwed into the rotation cylinder 132 or screwed out of the rotation cylinder 132. To enable the optimum shortening of the actuator 130 parts of the spindle 134 can be received by the hollow cylinder with thread 137.

A preferred embodiment of the above mentioned load sensor 40 according to the invention for protection of the electric parking brake 1 according to the invention against overload, damage and destruction is shown in FIG. 5.

The load sensor 40 operates on the basis of the known Hall-effect. A varying magnetic field generates a so-called electric Hall-voltage in electric conductors oriented perpendicular to this magnetic field. This Hall-voltage indicates the variation of the magnetic field and can be used for measurements after appropriate calibration.

As shown in FIG. 5, the load sensor 40 comprises a Hall-chip 41 attached to a chip fixing 42, a magnet 43 attached to a magnet fixing 44, at least one spring 45, an attachment 46 of the brake cable 60, a housing of the sensor 47 and a coupling unit 50 for attaching to the actuator 30; 130.

The Hall-chip 41 is mounted in an adjustable chip fixing 42. By means of the adjustment the Hall-chip 41 can be optimally orientated with respect to the magnetic field generated by the magnet 43. The magnet 43 is mounted in the magnet fixing 44 and can be realized either by a permanent magnet or by a coil. In the preferred embodiment of the load sensor 40 according to the invention the magnet fixing 44 and the attachment 46 of the brake cable 60 are combined in one part. However, it is also possible to provide the magnet fixing 44 and the attachment 46 of the brake cable 60 as separate parts.

The magnet fixing 44 comprises a plate like region on which the spring 45 rests. The spring 45 is helicoidally shaped, however, other spring configurations are possible for realizing the function of the load sensor 40. The spring 45 is installed with a bias between the plate like region of the magnet fixing 44 and the housing 47. For adjustment of the strength of the mechanical bias a housing cap 47 is adjustably attached to the housing 47.

Furthermore, the load sensor 40 comprises a coupling unit 50 for attaching to the actuator 30; 130. This coupling unit 50 can be provided by a non-positive or a positive connection. The positive connection could additionally serve for decoupling from the rotation executed by the actuator 30.

When the brake cable 60 is now mechanically loaded by tensile loads the common component consisting of magnet fixing 44 and attachment 46 of the brake cable 60 is displaced in arrow direction (see FIG. 6). At the same time the spring 45 is simultaneously compressed since it rests on the housing cap 47A. Because of the displacement of the magnet fixing 44 the distance between the magnet 43 and Hall-chip 41 is change. Thereby the magnetic field surrounding the Hall-chip 41 is also modified and a voltage is generated in the Hall-chip 41. Dependent on the spring constant of the spring 45 and the load applied by the brake cable 60 the displacement of the magnet 43 and the strength of the generated voltage in the Hall-chip 43 varies. If the generated voltage is calibrated to the force necessary for displacing the spring 45 a degree for mechanical loading of the brake cable 60 is indicated by the voltage generated in the Hall-chip 41. Since the mechanical load in the electric parking brake 1 according to the invention is uniformly distributed to the brake cables 60 the general loading of the electric parking brake 1 is also measured by means of the load sensor 40 according to the invention. Dependent on the threshold voltage which was generated in the load sensor 40 the electric parking brake 1 can be for example switched off in order to protected against overload, damage and destruction.

A further embodiment of the inventive load sensor 400 is shown in FIG. 6. The load sensor 400 comprises a pretension spring 451 for a proper prestress of the brake cable 60, a maximum tension spring 450 for control the maximum loading of the brake cables 60 and the electric parking brake 1 and a reset spring 452 for assuring the position of the magnet 430 with respect to the Hall-chip 410. The pretension spring 451 tightens the brake cables 60 in order to enable an immediate operation of the brakes. Non-operated, the maximum tension spring 450 is not loaded and has a certain distance of free displacement X along its longitudinal axis (see FIG. 6). If the parking brake 1 is applied, at first the pretension spring 451 is compressed by the distance X before the maximum tension spring 450 will be loaded. During displacing by the distance X, the position of the magnet 430 is not changed. The magnet 430 is attached to a sliding tube 487 on a cylinder 485 wherein the sliding tube 487 is pressed against a stop near the Hall-chip 410 by the reset spring 452. The cylinder 485 is freely displaceable by the distance X within the sliding tube 487. If the brake cables 60 are displaced beyond the distance X, the magnet 430 is displaced with respect to the Hall-chip 410 and a signal is generated which can be evaluated. The signal in the undisplaced condition characterizes the load induced by compression of the pretension spring 451 by the distance X. In the case of maximum loading of the parking brake 1 and the brake cables 60, the maximum tension spring 450 is compressed by a known distance because its spring constant is known. This known distance corresponds to a reference signal produced by the Hall-chip 410. This reference signal can be used to protect the parking brake 1 according to the invention against mechanical overload and to switch off the parking brake 1.

According to a preferred embodiment of the present invention the electric parking brake 1 according to the invention comprises a manual emergency system 70 which is arranged in the vehicle compartment being approachable by the driver (see FIG. 4). In the case of a failure of the electric motor 5 the electric parking brake 1 can be manually operated by means of the manual emergency system 70.

The manual emergency system 70 can be coupled with the set of gears 10 by means of a flexible shaft 72 which serves for transmitting a torque to the axis of the electric motor 5. Furthermore, the manual emergency system 70 comprises a lock 74, a set of gears of the system 76 and a spring 78. By setting in an appropriate key in the lock 74 two different functions can be realized. First the lock 74 and the set of gears of the system 76 can be displaced against the force of the spring 78 to the side turned away from the lock 74. Thereby the flexible shaft 72 is displaced in the direction of the axis of the motor and forms a positive connection within an appropriate retainer within the axis of the motor or within an elongation of the axis of the motor. Secondly, by means of the key a rotation can be transmitted to the flexible shaft 72 and therefore also to the axis of the motor.

Using this rotation the electric parking brake 1 according to the invention is operated. If the manual emergency system 70 is no longer operated the spring 78 pushes the set of gears of the system 76 and the lock 74 back. Thereby the end of the flexible shaft 72 is also released from the positive connection with the axis of the motor or with the elongation of the axis of the motor. Finally, the key is again removed from the manual emergency system 70.

Apart from the described preferred embodiments of the parking brake 1 and particularly the actuator 30; 130, it is also possible to realize the actuator by using hydraulic or pneumatic means. In general, every system is qualified for execution of the basic principle of the actuator by which a controlled length variation can be realized.

The invention claimed is:
1. A parking brake comprising:
    at least two brakes,
    at least two brake cables connected to the brakes,
    an actuator with linking devices to which the brake cables are linked at linking places, respectively; and
    an operator configured and connected to the actuator such that it can change the distance between the linking places in a controlled manner whereby a relative movement of the linking places toward and away from each other is enabled and whereby a uniform distribution of generated mechanical loads can be provided to brakes,
    wherein there is provided at one end of said actuator a load sensor including relatively movable first and second members, and at least a first spring and a second spring positioned to interact with the first and second members when the first and second members are moved relative to one another,
    said first spring functioning to generate a mechanical reference loading opposing the loading applied to the actuator by the brake cables,
    said second spring being arranged to resiliently bias the first and second members prior to a mechanical load being applied to the first spring, whereby pretension can be applied to the brake cables when linked to the linking devices, and
    said load sensor comprising a reset spring for resetting a control element in the load sensor.

2. A parking brake according to claim 1, wherein said first and second springs are different from each other and at least one of said first and second members form a housing containing said springs.

3. A parking brake according to claim 1, wherein the load sensor comprises a Hall-chip and a magnet; and wherein one of the Hall-chip and magnet is mounted to one of the first and second members, and the other is moved by the other of the first and second members when the first spring functions to generate a mechanical reference loading, whereby a loading signal is generated in the Hall-chip.

4. A parking brake according to claim 1, wherein the Hall-chip and the magnet are relatively adjustably mounted in the load sensor.

5. A parking brake according to claim 2, wherein the linking means are located at opposite ends of the actuator.

6. A parking brake according to claim 1, wherein the operator comprises a set of gears and an electric motor for generating and transmitting a rotation to the actuator so that a transformation of the rotation into a linear movement of the linking places is effected by the actuator.

7. A parking brake according to claim 6, wherein the actuator comprises a spindle and a nut rotatably driven by the set of gears, and the spindle is engaged by the nut such that rotation of the nut effects axial movement of the spindle.

8. A parking brake according to claim 7, wherein the actuator comprises a rotation cylinder with a crown gear engaging the set of gears whereby rotation of the set of gears will rotate the rotation cylinder.

9. A parking brake according to claim 8, wherein the actuator comprises a hollow cylinder having longitudinal grooves, and wherein the rotation cylinder comprises projections at its inner surface which engage grooves of the hollow cylinder whereby the rotation of the rotation cylinder can be transmitted to the hollow cylinder.

10. A parking brake according to claim 8, wherein the actuator comprises a threaded hollow cylinder and the nut is attached near an inner end of the rotation cylinder such that the spindle can be partly received by the hollow cylinder.

11. A parking brake according to claim 8, wherein the actuator comprises a hollow cylinder with a thread, and wherein the rotation cylinder comprises a thread complementary shaped to the thread of the hollow cylinder whereby the hollow cylinder can be screwed in or screwed out of the rotation cylinder by the rotation of the rotation cylinder.

12. A parking brake according to claim 8, wherein the actuator comprises a hollow cylinder having longitudinal grooves and the nut is attached near an inner end of the hollow cylinder such that the spindle can be partly received by the hollow cylinder.

13. A parking brake according to claim 12, wherein a first one of the two brake cables is coupled to a terminal region of the spindle by a first one of the linking devices, and the other brake cable is coupled to a terminal region of the hollow cylinder by a second one of the linking devices.

14. A parking brake according to claim 13, wherein the second linking device coupling the other brake cable to the terminal region of the hollow cylinder enables the hollow cylinder to be rotated relative to the other brake cable.

15. A parking brake according to claim 14, wherein the other brake cable comprises an enlargement and the second linking device comprises an attaching means wherein the end of the brake cable engages a slit-like opening of the attaching means.

16. A parking brake according to claim 1, wherein the parking brake comprises a manual emergency system by which the parking brake can be manually operated in the case of a failure of the operator, the manual emergency system including a manually operable torque transmission means for transmitting a torque to the operator.

17. A parking brake according to claim 11, wherein the thread of the nut and the thread of the rotation cylinder have an opposite sense of rotation so that the spindle and the hollow cylinder can be screwed in or screwed out of the rotation cylinder at the same time by the rotation of the rotation cylinder.

18. A parking brake comprising:
at least two brakes,
at least two brake cables connected to the brakes,
an actuator with linking devices to which the brake cables are linked at linking places, respectively; and
an operator configured and connected to the actuator such that it can change the distance between the linking places in a controlled manner whereby a relative movement of the linking places to toward and away from each other is enabled and whereby a uniform distribution of generated mechanical loads can be provided to brakes,
wherein there is provided at one end of said actuator a load sensor including relatively movable first and second members, and at least a first spring and a second spring positioned to interact with the first and second members when the first and second members are moved relative to one another,
said first spring functioning to generate a mechanical reference loading opposing the loading applied to the actuator by the brake cables,
said second spring being arranged to resiliently bias the first and second members prior to a mechanical load being applied to the first spring, whereby pretension can be applied to the brake cables when linked to the linking devices,
wherein the parking brake comprises a manual emergency system by which the parking brake can be manually operated in the case of a failure of the operator, the manual emergency system including a manually operable torque transmission means for transmitting a torque to the operator, and
wherein the manual emergency system comprises a lock with key which can be displaced against the force of a spring to engage the flexible shaft with the electric motor whereupon rotation of the flexible shaft will effect rotation of the electric motor.

19. A parking brake for a vehicle that includes at least two brakes, comprising:
an actuator mechanism including actuator members in threaded engagement with one another such that rotation of one relative to the other will extend or retract the actuator to increase or decrease the distance between opposite ends of the actuator,
brake cables respectively connected between the ends of the actuator mechanism and the brakes whereby extension and retraction of the actuator mechanism will engage and disengage the brakes, and
an actuator drive mechanism for relatively rotating the actuator members to extend or retract the actuator,
wherein the actuator mechanism further comprises a load sensor connected between a first one of the actuator members and a first one of the ends of the actuator mechanism such that tensile loads acting on the actuator mechanism also act on the load sensor, the load sensor including relatively movable members respectively connected to said first actuator member and first end of the actuator mechanism, a pre-tensioning spring for resiliently biasing the movable members apart whereby a tension can be applied the brake cables during an initial range of movement of the movable members, a second load measuring spring interposed between the movable members such that the second spring resiliently acts on the movable members only after the initial range of movement of the movable members, and a sensor for sensing such movement of the movable members after the initial range of movement and providing an output representative of the sensed amount of movement and said load sensor comprising a reset spring for resetting a control element in the load sensor.

* * * * *